(12) United States Patent
Sugano

(10) Patent No.: US 7,058,900 B2
(45) Date of Patent: Jun. 6, 2006

(54) CHINESE LANGUAGE INPUT SYSTEM BASED ON GRAPHIC FORM

(75) Inventor: Jin Sugano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 598 days.

(21) Appl. No.: 10/193,165

(22) Filed: Jul. 12, 2002

(65) Prior Publication Data

US 2003/0138145 A1    Jul. 24, 2003

(30) Foreign Application Priority Data

Jan. 21, 2002    (JP)    ............................ 2002-011459

(51) Int. Cl.
   *G06F 3/00*    (2006.01)
(52) U.S. Cl. ................. 715/773; 715/533; 382/185
(58) Field of Classification Search ................ 715/835, 715/773, 533; 382/185, 187

See application file for complete search history.

(56) References Cited

U.S. PATENT DOCUMENTS 4,621,340 A * 11/1986 Pokorny et al. ............ 345/468
5,923,778 A * 7/1999 Chen et al. .................. 382/185
6,760,477 B1 * 7/2004 Ko .............................. 382/185

FOREIGN PATENT DOCUMENTS

JP    4-124715    4/1992

* cited by examiner

*Primary Examiner*—Cao (Kevin) Nguyen
(74) *Attorney, Agent, or Firm*—Staas & Halsey LLP

(57) ABSTRACT

Every Chinese character belongs to a small graphic form group which is created with respect to the radical of the character instead of character components. Every small graphic form group is incorporated into higher-level groups, i.e. medium graphic form groups, in turn every medium graphic form group is incorporated into higher-level groups, i.e. large graphic form groups. Input guidance is provided according to this hierarchy concerning graphic form. More specifically, the large groups are presented and one of them is selected by the first keystroke, the medium groups are presented and one of them is selected by the second keystroke, and the small groups are presented and one of them to which the desired character for input belongs is selected by the third keystroke. In this fashion, three keystrokes to a numeric keypad efficiently narrows down the alternative characters for conversion.

11 Claims, 28 Drawing Sheets

- 1st STROKE : HORIZONTAL
- 2nd STROKE : VERTICAL

- 1st STROKE: VERTICAL
- 2nd STROKE: TURNING
- 3rd STROKE: HORIZONTAL (D)

| 121/2 | 1-12车马 | 1*符 |
|---|---|---|
| 口口 | 2* | 35人食 |
| 3* | 41-43言 | 4* |
|  | 5 |  |

| button | guide | pointer |
|--------|-------|---------|
| 1 | 12½ | D1 |
| 2 | 1-12 车马 | D2 |
|   |   |   |
| 0 | 5 | D0 |

| button | guide | pointer |
|---|---|---|
| 1 | 土左 1-4 | D11 |
| 2 | 土*老赤 | D12 |
|  |  |  |
| 0 | 廾 5 耳 | D10 |

D2

| button | guide | pointer |
|---|---|---|
| 1 | 一 1-3 | D21 |
| 2 | 一*二 | D22 |
|  |  |  |
| 0 | 11*12* | D20 |

．
．
．

D0

| button | guide | pointer |
|---|---|---|
| 1 | 尸弓艮己 | D01 |
| 2 | 阝左 | D02 |
|  |  |  |
| 0 | 5* | D00 |

| 土左1-4 | 土*老赤 | 扌1士 |
|---|---|---|
| 扌2/4 | 扌3工 | 扌5走彡 |
| 艹1-2 | 艹3其 | 艹4革 |
|  | 艹5耳 |  |

(D2)...1-12车马

| 一1-3 | 一*二 | 王 |
|---|---|---|
| 木左1-2 | 木左3-4 | 木* |
| 酉十 | 车 | 马 |
|  | 11*12* |  |

(D3)...1*符

| 石 | 页雨 | 厂戈 |
|---|---|---|
| 大匚歹 | 1* | 常标 |
| 算符 | 引括 | 书括 |
|  | 特符 |  |

(D4)...口口

| 口左1 | 口左2-3 | 口左4-5 |
|---|---|---|
| 口*门 | 足电 | 虫左1-3 |
| 虫左*田 | 虫*日左 | 日* |
|  | 目灬 |  |

(D5)...2*

| 刂 | 山 | 忄1-3 |
|---|---|---|
| 忄*小 | 贝见 | 门巾皿 |
| 21卜 | 25* | 2* |
|  |  |  |

(D6)...35人食

| 亻1-2 | 亻3人1-3 | 亻4-5人* |
|---|---|---|
| 个食刀勹 | 月左1-3 | 月*用 |
| 犭冂 | 鸟欠角 | 鱼夕冬 |
|  | 儿几 |  |

(D7)...3*

| 丿白 | 禾攵 | ⺮1-4 |
|---|---|---|
| ⺮5爫爪 | 钅1-2金 | 钅3-5 |
| 31* | 32* | 33* |
|  | 34* |  |

(D8)...41-43言

| 讠1-2言 | 讠3-5 | 亠方 |
|---|---|---|
| 一* | 广麻鹿 | 疒 |
| 丷丬 | 门 | 羊米 |
|  | 火 |  |

(D9)...4*

| 氵1 | 氵2 | 氵3 |
|---|---|---|
| 氵4 | 氵5穴 | 宀 |
| 辶1-3 | 辶4-5衤 | 心 |
|  | 4* |  |

(D0)...5

| 尸弓艮己 | 阝左 | 阝右卩 |
|---|---|---|
| 女1-3母 | 女*皮 | 纟1-2厶 |
| 纟3-4糸 | 纟5子力 | 又乙 |
|  | 5* |  |

| button | guide | G.F. code |
|---|---|---|
| 1 | 土左12 | 111 |
| 2 | 土左13 | 112 |
|  |  |  |
| 0 | 土左4* | 110 |

D01

| button | guide | G.F. code |
|---|---|---|
| 1 | 尸1 | 011 |
| 2 | 尸2/0 | 012 |
|  |  |  |
| 0 | 己 | 010 |

D12

| button | guide | G.F. code |
|---|---|---|
| 1 | 土左51/2 | 121 |
| 2 | 土左5* | 122 |
|  |  |  |
| 0 | 赤 | 120 |

D02

| button | guide | G.F. code |
|---|---|---|
| 1 | 阝左11 | 021 |
| 2 | 阝左12 | 022 |
|  |  |  |
| 0 | 阝左5 | 020 |

D10

| button | guide | G.F. code |
|---|---|---|
| 1 | 艹51/0 | 101 |
| 2 | 艹52 | 102 |
|  |  |  |
| 0 |  |  |

D00

| button | guide | G.F. code |
|---|---|---|
| 1 | ヨ互 | 001 |
| 2 | 푬 | 002 |
|  |  |  |
| 0 | 幺巛 | 000 |

| 土左12 | 土左13 | 土左1* |
|---|---|---|
| 土左25 | 土左2* | 土左31/2 |
| 土左33/4 | 土左35 | 土左41 |
|  | 土左4* |  |

(D12)...土*老赤

| 土左51/2 | 土左5* | 土*11/2 |
|---|---|---|
| 土*1* | 土*2 | 土*3 |
| 土*4 | 土*5/0 | 老 |
|  | 赤 |  |

(D13)...扌1士

| 扌11 | 扌卄 | 扌十 |
|---|---|---|
| 扌12* | 扌13 | 扌14/5 |
| 士1/2 | 士3/4 | 士5 |
|  | 士0 |  |

(D14)...扌2/4

| 扌21 | 扌日田 | 扌口 |
|---|---|---|
| 扌25* | 扌2* | 扌立 |
| 扌41* | 扌42/3 | 扌44 |
|  | 扌45 |  |

(D15)...扌3工

| 扌31 | 扌32 | 扌33 |
|---|---|---|
| 扌人 | 扌34* | 扌勹ク |
| 扌35* | 工1-2 | 工3-4 |
|  | 工5/0 |  |

(D16)...扌5走彡

| 扌厂 | 扌51* | 扌52 |
|---|---|---|
| 扌53 | 扌54 | 扌5* |
| 走1-2 | 走5 | 走* |
|  | 彡 |  |

(D17)...卄1-2

| 卄11 | 卄土木 | 卄12* |
|---|---|---|
| 卄13 | 卄14 | 卄15 |
| 卄日 | 卄灬 | 卄田口 |
|  | 卄2* |  |

(D18)...卄3其

| 卄31 | 卄32 | 卄33 |
|---|---|---|
| 卄人 | 卄34* | 卄勹ク |
| 卄35* | 其3 | 其* |

(D19)...卄4革

| 卄方亡 | 卄41* | 卄42/3 |
|---|---|---|
| 卄氵 | 卄44* | 卄宀 |
| 卄45* | 革1 | 革* |

(D10)...卄5耳

| 卄51/0 | 卄52 | 卄53 |
|---|---|---|
| 卄54 | 卄55 | 耳2 |
| 耳4 | 耳5 | 耳* |

| 一二 | 一1* | 一21/2 |
|---|---|---|
| 一24 | 一口 | 一冂 |
| 一25* | 一2* | 不 |
|  | 一3* |  |

(D22)...一*二

| 一4 | 一51/2 | 一53 |
|---|---|---|
| 一54 | 一55/0 | 一0 |
| 二1-2 | 二3-4 | 二5 |
|  | 二0 |  |

(D23)...王

| 王11 | 王12 | 王1* |
|---|---|---|
| 王25 | 王2* | 王34 |
| 王3* | 王41 | 王4* |
|  | 王5/0 |  |

(D24)...木左1-2

| 木左11 | 木左上木 | 木左卄 |
|---|---|---|
| 木左十 | 木左12* | 木左13 |
| 木左1* | 木左日田 | 木左25* |
|  | 木左2* |  |

(D25)...木左3-4

| 木左31 | 木左32 | 木左33 |
|---|---|---|
| 木左34 | 木左勺勺 | 木左35* |
| 木左41 | 木左43 | 木左44 |
|  | 木左4* |  |

(D26)...木*

| 木左51 | 木左54 | 木左5* |
|---|---|---|
| 木中1 | 木中* | 木*1 |
| 木*2 | 木*3 | 木*4 |
|  | 木*5 |  |

(D27)...酉十

| 酉1 | 酉2 | 酉3 |
|---|---|---|
| 酉4 | 酉5/0 | 十下 |
| 十*口日 | 十*2* | 丨*5 |
|  | 丨** |  |

(D28)...车

| 车左12 | 车左1* | 车左2 |
|---|---|---|
| 车左34 | 车左3* | 车左4 |
| 车左5 | 车*1-5 | 车*0 |

(D29)...马

| 马1 | 马2 | 马3 |
|---|---|---|
| 马4 | 马5 | 马0 |

(D20)...11*12*

| 耒 | 青 | 麦 |
|---|---|---|
| 示 | 韦 | 寸 |
| 臣 | 豆 | 西5 |
|  | 西* |  |

| 石11 | 石12 | 石1* |
|---|---|---|
| 石2/0 | 石35 | 石3* |
| 石41 | 石43 | 石4* |
|  | 石5 |  |

(D32)...页雨

| 页1 | 页2 | 页3 |
|---|---|---|
| 页4 | 页5/0 | 雨1 |
| 雨2 | 雨3 | 雨4/0 |
|  | 雨5 |  |

(D33)...厂戈

| 厂1 | 厂2 | 厂3-4 |
|---|---|---|
| 厂5 | 厂0 | 弋 |
| 戈1* | 戈2 | 戊 |
|  | 戈* |  |

(D34)...大匚歹

| 大上1 | 大1* | 大2-3 |
|---|---|---|
| 大4 | 大5/0 | 匚3 |
| 匚* | 歹1-2 | 歹3 |
|  | 歹* |  |

(D35)...1*

| 辰 | 廾 | 犬 |
|---|---|---|
| 九 | 豕 | 龙 |
| 比 | 弋 | 瓦 |
|  |  |  |

(D36)...常标

| ， | 。 | 、 |
|---|---|---|
| · | ： | ； |
| ？ | ！ | … |
|  | — |  |

(D37)...算符

| ＋ | － | × |
|---|---|---|
| ÷ | ％ | ± |
| ＝ | ≠ | ： |
|  | ～ |  |

(D38)...引括

| （ | ） | ' |
|---|---|---|
| ' | " | " |
| 「 | 」 | 『 |
|  | 』 |  |

(D39)...书括

| 〈 | 〉 | 《 |
|---|---|---|
| 》 | 〔 | 〕 |
| 〖 | 〗 | 【 |
|  | 】 |  |

(D30)...特符

| ↑ | ↓ | ← |
|---|---|---|
| → | 〃 | 々 |
| № | § | ￥ |
|  | ＄ |  |

| 口左11 | 口左卄 | 口左土土 |
|---|---|---|
| 口左十 | 口左12* | 口左13 |
| 口左14/5 | | |
| | | |

(D42)...口左2-3

| 口左21 | 口左日 | 口左25* |
|---|---|---|
| 口左2* | 口左31 | 口左32 |
| 口左33 | 口左34 | 口左35 |
| | | |

(D43)...口左4-5

| 口左41/2 | 口左43 | 口左44/5 |
|---|---|---|
| 口左51 | 口左52 | 口左53 |
| 口左54 | 口左55 | |
| | | |

(D44)...口*口

| 口*1 | 口*2 | 口*3 |
|---|---|---|
| 口*4 | 口*5/0 | 口11 |
| 口1* | 口2 | 口3 |
| | 口4-5 | |

(D45)...足亀

| 足11/2 | 足1* | 足2 |
|---|---|---|
| 足35 | 足3* | 足4 |
| 足5 | 足 | 亀 |
| | | |

(D46)...虫左1-3

| 虫左卄 | 虫左12* | 虫左1* |
|---|---|---|
| 虫左口日 | 虫左25* | 虫左2* |
| 虫左31 | 虫左32 | 虫左3* |
| | | |

(D47)...虫左*田

| 虫左41 | 虫左43 | 虫左4* |
|---|---|---|
| 虫左5 | 田中 | 田1 |
| 田2 | 田3 | 田4 |
| | 田5 | |

(D48)...虫*日左

| 虫*1 | 虫** | 日左12 |
|---|---|---|
| 日左1* | 日左2 | 日左31/2 |
| 日左33/4 | 日左35 | 日左4 |
| | 日左5 | |

(D49)...日*

| 日上十 | 日上12* | 日上1* |
|---|---|---|
| 日上2 | 日上3 | 日上4-5 |
| 日下1 | 日下* | 是 |
| | 日* | |

(D40)...目灬

| 目1 | 目31 | 目32 |
|---|---|---|
| 目3* | 目4 | 目5 |
| 目* | 灬1 | 灬* |
| | | |

| 刂11/2 | 刂13/4 | 刂15 |
|---|---|---|
| 刂口日 | 刂2* | 刂31/2 |
| 刂3* | 刂41 | 刂4* |
|  | 刂5 |  |

(D52)... 山

| 山左1-2 | 山左3 | 山左4-5 |
|---|---|---|
| 山上1 | 山上2 | 山上3 |
| 山上4-5 | 山下 | 山* |
|  | 山0 |  |

(D53)... 忄 1-3

| 忄11 | 忄卄上 | 忄12* |
|---|---|---|
| 忄1* | 忄日 | 忄25* |
| 忄2* | 忄31 | 忄32 |
|  | 忄3* |  |

(D54)... 忄*小

| 忄41 | 忄4* | 忄51 |
|---|---|---|
| 忄54 | 忄5* | 丷 |
| 丷 | 少 | 小* |
|  | 小0 |  |

(D55)... 贝见

| 贝左1 | 贝下1 | 贝2 |
|---|---|---|
| 贝左3 | 贝下3 | 贝4 |
| 贝5/0 | 见1 | 见2-4 |
|  | 见5/0 |  |

(D56)... 门巾皿

| 门十 | 门1* | 门* |
|---|---|---|
| 巾1 | 巾2 | 巾3 |
| 巾* | 皿1 | 皿2 |
|  | 皿* |  |

(D57)... 21卜

| 卜1 | 卜* | 止1 |
|---|---|---|
| 止2 | 止* | 齿 |
| 卤 | 疒 | 支 |
|  |  |  |

(D58)... 25*

| 里 | 水1-5 | 水0 |
|---|---|---|
| 骨3-4 | 骨* | 黑1 |
| 黑* |  |  |
|  |  |  |

(D59)... 2*

| 丨1 | 丨口 | 丨日 |
|---|---|---|
| 丨* | 业 |  |
|  |  |  |
|  |  |  |

(D50)

| | | |
|---|---|---|
| | | |
| | | |
| | | |
| | | |

| | | |
|---|---|---|
| | | |
| | | |
| | | |
| | | |

| | | |
|---|---|---|
| | | |
| | | |
| | | |
| | | |

| 亻11 | 亻艹木 | 亻十 |
|---|---|---|
| 亻12* | 亻13/4 | 亻15 |
| 亻日田 | 亻口 | 亻25* |
|  | 亻2* |  |

(D62)... 亻3人1-3

| 亻 | 亻31* | 亻32/3 |
|---|---|---|
| 亻34 | 亻勹冖 | 亻35* |
| 人11 | 人1* | 人2 |
|  | 人3 |  |

(D63)... 亻4-5人*

| 亻41 | 亻42/3 | 亻44/5 |
|---|---|---|
| 亻51 | 亻53 | 亻54 |
| 亻5* | 人4 | 人5 |
|  | 人0 |  |

(D64)... 饣食刀勹

| 饣1 | 饣2 | 饣35 |
|---|---|---|
| 饣3* | 饣4-5 | 食 |
| 刀勹1 | 刀勹2 | 刀勹3-4 |
|  | 刀勹5/0 |  |

(D65)... 月左1-3

| 月左11 | 月左十 | 月左12* |
|---|---|---|
| 月左1* | 月左25 | 月左2* |
| 月左31/2 | 月左33/4 | 月左35 |
|  |  |  |

(D66)... 月*用

| 月左41/2 | 月左43 | 月左44 |
|---|---|---|
| 月左45 | 月左5 | 月*1 |
| 月*3-4 | 月** | 用 |
|  |  |  |

(D67)... 犭勹

| 犭艹 | 犭12 | 犭1* |
|---|---|---|
| 犭2 | 犭3 | 犭4 |
| 犭5 | 勹2 | 勹* |
|  |  |  |

(D68)... 鸟欠角

| 鸟1 | 鸟2 | 鸟3 |
|---|---|---|
| 鸟4 | 鸟5/0 | 欠1 |
| 欠* | 角 |  |
|  |  |  |

(D69)... 鱼夕冬

| 鱼1 | 鱼2 | 鱼3 |
|---|---|---|
| 鱼4 | 鱼* | 夕1-2 |
| 夕* | 冬1 | 冬2 |
|  | 冬3-5 |  |

(D60)... 儿几

| 儿1-2 | 儿3-5 | 儿0 |
|---|---|---|
| 几1-3 | 几4-5 | 几0 |
| 风 | 殳 |  |
|  |  |  |

| 丿11 | 丿12 | 丿1* |
|---|---|---|
| 丿2 | 丿3 | 丿4 |
| 丿5 | 白1-2 | 白3 |
|  | 白* |  |

(D72)... 禾欠

| 禾1 | 禾口 | 禾2* |
|---|---|---|
| 禾3 | 禾4 | 禾5/0 |
| 欠1 | 欠2-3 | 欠4 |
|  | 欠5 |  |

(D73)... ⺮1-4

| ⺮11 | ⺮卄土 | ⺮12* |
|---|---|---|
| ⺮1* | ⺮2 | ⺮31/2 |
| ⺮3* | ⺮41/2 | ⺮4* |

(D74)... ⺮5彳爪

| ⺮51 | ⺮* | 彳12 |
|---|---|---|
| 彳1* | 彳2 | 彳3 |
| 彳4 | 彳5 | 爫3-4 |
|  | 爪* |  |

(D75)... 钅1-2金

| 金 | 钅11 | 钅卄 |
|---|---|---|
| 钅十 | 钅12* | 钅1* |
| 钅口日田 | 钅25* | 钅2* |

(D76)... 钅3-5

| 钅31 | 钅32 | 钅35 |
|---|---|---|
| 钅3* | 钅立 | 钅41* |
| 钅43 | 钅4* | 钅51 |
|  | 钅5* |  |

(D77)... 31*

| 手下 | 手* | 缶 |
|---|---|---|
| 矢 | 毛 | 气 |
| 牛1 | 牛3 | 牛* |
|  | 舌 |  |

(D78)... 32*

| 片 | 臼 | 鼠 |
|---|---|---|
| 隹右 | 隹* | 自 |
| 鼻 | 身 | 鬼 |
|  | 血 |  |

(D79)... 33*

| 舟2 | 舟3 | 舟4 |
|---|---|---|
| 舟* | 瓜 | 彡 |
| 斤3 | 斤4 | 斤* |

(D70)... 34*

| 八下1 | 八下* | 八丷*11 |
|---|---|---|
| 八丷*1* | 八丷*5 | 八丷** |
| 父 | 谷 | 采 |
|  | 豸 |  |

| 讠青 | 讠11* | 讠卄 |
|---|---|---|
| 讠十 | 讠12* | 讠1* |
| 讠25 | 讠2* | 言1-2 |
|  | 言* |  |

(D82)...讠3-5

| 讠丿 | 讠31* | 讠32 |
|---|---|---|
| 讠33/4 | 讠35 | 讠41 |
| 讠丷 | 讠43* | 讠4* |
|  | 讠5 |  |

(D83)...亠方

| 高 | 亠口 | 亠2* |
|---|---|---|
| 六 | 亠3* | 亠5 |
| 亠* | 方亠 | 方* |
|  |  |  |

(D84)...亠*

| 文 | 衣下 | 衣* |
|---|---|---|
| 立1/0 | 立2 | 立3-5 |
| 辛 | 音 |  |
|  |  |  |

(D85)...广麻鹿

| 广廿 | 广1* | 广2 |
|---|---|---|
| 广32 | 广3* | 广4 |
| 广* | 麻 | 鹿 |
|  |  |  |

(D86)...疒

| 疒十 | 疒12* | 疒1* |
|---|---|---|
| 疒2 | 疒31/2 | 疒35 |
| 疒3* | 疒4 | 疒51/2 |
|  | 疒5* |  |

(D87)...冫扌

| 冫1 | 冫2 | 冫丿 |
|---|---|---|
| 冫3* | 冫4 | 冫5 |
| 扌1 | 扌* |  |
|  |  |  |

(D88)...门

| 门十 | 门1* | 门口 |
|---|---|---|
| 门2* | 门3 | 门4 |
| 门* |  |  |
|  |  |  |

(D89)...羊米

| 羊2 | 羊* | 丰 |
|---|---|---|
| 羊* | 米1 | 米2 |
| 米3 | 米4 | 米5/0 |
|  |  |  |

(D80)...火

| 火左11/2 | 火左1* | 火左2 |
|---|---|---|
| 火左35 | 火左3* | 火左43/4 |
| 火左4* | 火左5 | 火*3-5 |
|  | 火** |  |

| 氵丰丰 | 氵11* | 氵酉西 |
|---|---|---|
| 氵艹 | 氵工木 | 氵士士 |
| 氵十 | 氵12* | 氵13 |
|  | 氵14/5 |  |

(D92)...氵2 礻

| 氵21 | 氵日 | 氵口目 |
|---|---|---|
| 氵25* | 氵2* | 礻1 |
| 礻2 | 礻3 | 礻4 |
|  | 礻5 |  |

(D93)...氵3

| 氵宀 | 氵31* | 氵32 |
|---|---|---|
| 氵33 | 氵人罒 | 氵34* |
| 氵勹冖 | 氵35* |  |

(D94)...氵4 冖

| 氵文立方 | 氵41* | 氵42 |
|---|---|---|
| 氵43 | 氵44 | 氵冖 |
| 氵45* | 冖1 | 冖* |

(D95)...氵5 穴

| 氵尸 | 氵51* | 氵53 |
|---|---|---|
| 氵又 | 氵54* | 氵5* |
| 穴1 | 穴3 | 穴5 |
|  | 穴* |  |

(D96)...宀

| 宀井 | 宀11* | 宀12 |
|---|---|---|
| 宀13 | 宀14/5 | 宀2 |
| 宀35 | 宀3* | 宀4 |
|  | 宀5 |  |

(D97)...辶1-3

| 辶11 | 辶12 | 辶13 |
|---|---|---|
| 辶14/5 | 辶2 | 辶31 |
| 辶32 | 辶33 | 辶34 |
|  | 辶35 |  |

(D98)...辶4 5 礻

| 辶41 | 辶43 | 辶4* |
|---|---|---|
| 辶51 | 辶53 | 辶5* |
| 礻1 | 礻2 | 礻3-4 |
|  | 礻5 |  |

(D99)...心

| 心中 | 心12 | 心1* |
|---|---|---|
| 心2 | 心31/2 | 心33/4 |
| 心35 | 心41 | 心4* |
|  | 心5 |  |

(D90)...4*

| 、1 | 、3 | 、5 |
|---|---|---|
| 、* | 斗 | 灬1 |
| 灬2 | 灬* | 户 |

| 尸1 | 尸2/0 | 尸3 |
|---|---|---|
| 尸4 | 尸5 | 弓左1-2 |
| 弓左* | 弓* | 艮 |
|  | 己 |  |

(D02)...阝左

| 阝左11 | 阝左12 | 阝左13 |
|---|---|---|
| 阝左14/5 | 阝左2 | 阝左34 |
| 阝左35 | 阝左3* | 阝左4 |
|  | 阝左5 |  |

(D03)...阝右卩

| 阝右12 | 阝右1* | 阝右2 |
|---|---|---|
| 阝右3 | 阝右41 | 阝右4* |
| 阝右5 | 卩巴1-2 | 卩巴3-4 |
|  | 卩巴5 |  |

(D04)...女1-3母

| 女左11 | 女左12 | 女左1* |
|---|---|---|
| 女左口 | 女左25* | 女左2* |
| 女左31 | 女左35 | 女左3* |
|  | 母 |  |

(D05)...女*皮

| 女左41 | 女左44 | 女左45 |
|---|---|---|
| 女左4* | 女左51 | 女左52/3 |
| 女左54/5 | 女下 | 女* |
|  | 皮 |  |

(D06)...纟1-2厶

| 纟11 | 纟十 | 纟12* |
|---|---|---|
| 纟15 | 纟1* | 纟口日 |
| 纟25* | 纟2* | 厶2 |
|  | 厶* |  |

(D07)...纟3-4糸

| 纟32 | 纟34 | 纟勹个 |
|---|---|---|
| 纟35* | 纟3* | 纟41 |
| 纟43 | 纟4* | 糸1-2 |
|  | 糸* |  |

(D08)...纟5子力

| 纟51 | 纟54 | 纟5* |
|---|---|---|
| 子1-3 | 子4-5 | 子0 |
| 力1 | 力2 | 力3-4 |
|  | 力5/0 |  |

(D09)...又乙

| 又1-2 | 又3-4 | 又5 |
|---|---|---|
| 又0 | 乙1/0 | 乙2 |
| 乙3 | 乙4 | 乙5 |

(D00)...5*

|  |  |  |
|---|---|---|
| 彐且 | 聿 | 凵5 |
| 凵* | 疋 | 羽1-2 |
| 羽* | 夂 | 矛 |
|  | 幺巛 |  |

FIG. 25

| (G.F. code) | (WORD) |
|---|---|
| 111 | 域,塔,填,墙,堵,埔,堪,埂,堰,垣,柑,坷,塌,垭,堙,埴,堞 |
| 111111549838 | 塔塔尔族 |
| 111114 | 柑埚 |
| 111119 | 填坟 |
| 111128 | 墙壁 |
| 111137277838 | 塔吉克族 |
| 111163 | 墙报,填报 |
| 111189 | 墙基 |
| 111212 | 填表 |
| 111258 | 塔楼 |
| 111261 | 墙根 |
| 111284 | 塔轮 |
| 111336 | 堵截 |
| 111342074 | 塔夫绸 |
| 111421 | 堵嘴 |
| 111442 | 塔吊 |
| 111445 | 垭口 |
| 111446086 | 墙围子 |
| 111498495603 | 墙旮旯儿 |
| 111564 | 堪布 |
| 111639 | 填仓 |
| 111652 | 墙脚 |
| 111682 | 填鸭 |
| 111682358 | 填鸭式 |
| 111688 | 墙角 |
| 111602 | 填充 |
| 111777688 | 墙犄角 |
| 111702 | 填具,堪舆 |
| 111820 | 填词 |
| 111839 | 填方 |
| 111898 | 填料 |
| 111800 | 塔灰,堙灭 |
| 111927 | 填补 |
| 111920 | 墙裙 |
| 111938 | 堙没 |
| 111948 | 填写 |
| 111957 | 填空 |
| 111959959 | 填窟窿 |
| 111961 | 堵塞 |
| 111973949 | 堪达罕 |
| 111991 | 堵心 |
| 111904 | 墙头 |
| 111904177 | 墙头草 |
| 111904814 | 墙头诗 |
| ....... | |

FIG. 27

C.C.(A) ---------------------------- (CHARACTER G.)
C.C.(A), C.C.(A) ---------------------- (CHARACTER G.)
C.C.(A), C.C.(B) ---------------------- (CHARACTER G.)
  ......

C.C.(A), C.C.(A), C.C.(A) -------------- (CHARACTER G.)
C.C.(A), C.C.(A), C.C.(B) -------------- (CHARACTER G.)
  ......

C.C.(B) ---------------------------- (CHARACTER G.)
C.C.(B), C.C.(A) ---------------------- (CHARACTER G.)
C.C.(B), C.C.(B) ---------------------- (CHARACTER G.)
  ......

C.C.(B), C.C.(A), C.C.(A) -------------- (CHARACTER G.)
C.C.(B), C.C.(A), C.C.(B) -------------- (CHARACTER G.)
  ......

FIG. 30
PRIOR ART

CHINESE LANGUAGE INPUT SYSTEM BASED ON GRAPHIC FORM

BACKGROUND OF THE INVENTION

1. Field of the Invention

The present invention relates to a Chinese language input system according to which characters are inputted based on their graphic form, more specifically, to a program product comprising a Chinese language input program, a Chinese language input apparatus, and a Chinese language input method based on characters' graphic form via limited number of keys. The present disclosure relates to subject matter contained in Japanese Patent application No. 2002-011459 (filed on Jan. 21, 2002), which is expressly incorporated herein by reference in its entirety.

2. Description of the Related Art

A method is utilized in which Chinese characters are entered on the basis of their graphic form. According to the method, each character is broken down into Chinese character component, i.e. parts of a character. A user specifies a desired character by designating a combination of the character components. Basic education in schools does not adopt the concept of the character components, which is developed for input of Chinese language. When a program or an apparatus for inputting Chinese language is developed, it is not an exception that a set of character components is newly developed with adherence to the given conditions.

Though methods are not unified of breaking down the graphic form of Chinese characters as described above, it is common that each method breaks down the Chinese characters into more than 500 character components. For the input of the character components more than 500 via a few tens of keys, the character components are classified into a few tens of character component groups. According to this, each character component belongs to one of the character component groups. It is therefore required for users not only to learn all of character components more than 500 by heart but also to keep in mind which component group each component belongs.

Most of Chinese characters have a configuration in which a character is composed of plural character components. Users narrow down alternative characters for input by designating character components with their order according to a certain rule which prescribes the composition of character components. Besides the aforementioned character components and character component groups, the users should keep the rule of the composition of character components in mind. FIG. 30 is an explanatory diagram showing conventional input method based on graphic form. As shown in the figure, character components (C.C.) are designated with their order according to the rule of the composition to specify a character group which matches the designated conditions.

Recently, methods for input into a cellular phone and PDA (Personal Digital Assistant) have been developed. According to the methods, character component groups are created so that two keystrokes of a keypad having nine keys can select one of the component groups. More specifically, 81 character component groups are created, and the component groups are further classified into nine types on the basis of character form. The first keystroke selects the features of the graphic form of the character component to be inputted. The second keystroke selects the desired one having the features among the character component groups. The third keystroke selects the features of graphic form of the character component to be subsequently inputted. Further, in the forth keystroke and thereafter, the desired character is selected from the character component group which matches the conditions already inputted. The methods for nine keys are different from the aforementioned ones for a few tens of keys, because the methods for nine keys require two keystrokes, instead of one, to select a character component group. However, the fundamental concepts of both methods are identical each other.

According to the conventional methods of input based on graphic form, both of the first character component to be inputted at the start and the second character component to be subsequently inputted, are selected among the common components created by a certain prescription of breaking down characters. It is difficult for the users, after the first designation of narrowing down alternatives, further to narrow down the alternatives efficiently by the subsequent designation. In other words, because both of the first and second conditions for narrowing down are designated based on the common character components created by a certain prescription of breaking down characters, it is impossible to assign a large number of characters evenly to character groups each of which should be specified by designation.

According to the methods for input, there are components each indicating characters numbering in about 350 out of 6,763 characters prescribed in GB code (GB2312).

The some 350 characters narrowed down as described above, are further narrowed down by the third keystroke. If some 350 characters can evenly be classified into nine groups concerning input via nine keys, the number of characters assigned to each of keys is about 40. As a matter of fact, because the third keystroke is made based on the same alternatives as the first keystroke, it is impossible evenly to assign characters to each key. More specifically, there are cases where about 80 keys are assigned to a key. According to this, narrowing down is too insufficient to actualize efficient input.

SUMMARY OF THE INVENTION

It is an object of the present invention to provide a program product, an apparatus and a method for inputting a Chinese character efficiently via a limited number of keys.

To accomplish the above object, according to one aspect of the present invention, a graphic form classification is adopted. The classification classifies all characters assumed for input into many small graphic form groups. According to the classification, each small graphic form group belongs to one of higher-level groups to form a multi-layered hierarchical structure. At first, one of higher-level groups according to the hierarchy is selected. Then, one of lower level groups belonging to the selected higher-level group is further selected. This selection specifies a small graphic form group. Provided that characters are, for example, classified into about a thousand small graphic form groups with frequently used characters being classified into different groups, the graphic form small groups are classified into about a hundred medium graphic form groups, and the medium graphic form groups are classified into about ten large graphic form groups. Accordingly, three keystrokes to a keypad with about ten keys such as a numeric keypad can specify a small graphic form group. Chinese language input becomes possible which is based on graphic form and for various information devices. The devices, for instance, may be a cellular phone or a PDA.

The characters classified into small graphic form groups can be the simplified or the traditional character set. Further, the characters can be those used in Japan, Korea, or another country or region.

BRIEF DESCRIPTION OF THE DRAWINGS

The invention will be described below in detail with reference to the accompanying drawings, in which:

FIG. 10 is a schematic view of the second displaying part at the Chinese input mode (large group selecting);

FIG. 12 is a schematic diagram showing the large table according to an embodiment of the present invention;

FIG. 13 is a schematic diagram showing the medium tables according to an embodiment of the present invention;

FIG. 14 illustrates schematic views of the second displaying part at the medium group selecting;

FIG. 15 is a schematic diagram showing the small tables according to an embodiment of the present invention;

FIGS. 16–25 are schematic views of the second displaying part at the small group selecting;

FIG. 27 is a schematic diagram showing dictionary data;

FIG. 30 is an explanatory diagram showing a conventional input method based on graphic form.

DESCRIPTION OF THE PREFERRED EMBODIMENT

Figure 1:
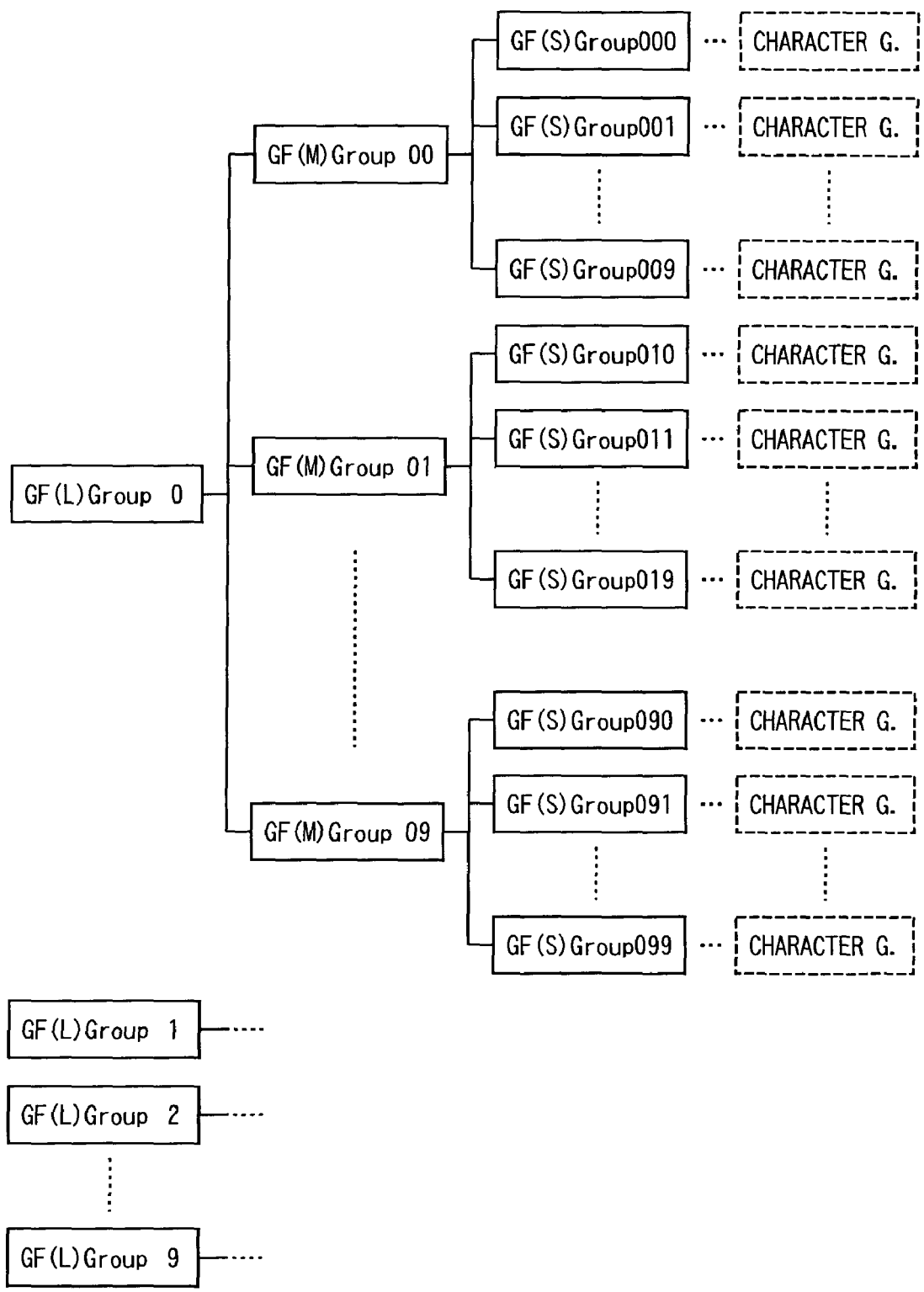
FIG. 1 is an explanatory diagram showing classification according to an embodiment of the present invention.

One embodiment of the present invention will hereinafter be described with reference to the accompanying drawings. To begin with, classification with respect to graphic form according to the present invention will be explained. The classification classifies Chinese characters so that frequently used characters should not concentrate into a group, based on a statistical survey concerning characters' frequency of use. In other words, it is considered that frequently used characters belong to different groups.

This classification does not adopt "character components" which are conventionally used. Besides, the classification adopts "radicals" utilized in basic educations in schools. Because ordinal users of the Chinese characters have knowledge about radicals, they can understand the classification without extra learning on the radicals. The number of radicals is much fewer than that of character components, and most of the radicals have their own meanings. Accordingly, the definitions and features of groups into which characters are classified based on graphic form, is easy to be understood. Further, even people does not have knowledge on the radicals can learn the knowledge much easier than learning character components. The knowledge learnt is so conformable to the basic educations in schools that the classification based on radicals is useful for education of Chinese characters.

To every Chinese character, the corresponding radical is assigned. Accordingly, the characters are classified into about 200 groups corresponding to the some 200 radicals. Characters prescribed in GB2312 being concerned, there are from a few characters to a several hundred of them in each group corresponding to a radical. Each group corresponding to a radical in which the frequently used characters are fewer than others, is incorporated into one graphic form group. On the other hand, each group corresponding to a radical in which the frequently used characters are more than others, is further classified. Note that the element excluding a radical of a character is designated as the element without a radical. The graphic information of the element without a radical is utilized for the detailed classification.

As the graphic information of the element without a radical, the strokes and the stroke order are utilized of the element without a radical. More specifically, the information is utilized which includes, for example, the first, second, and third strokes according to the stroke order when the element without a radical is written. It is defined which strokes from the beginning are utilized according to the degree of classification. That is, many frequently used characters corresponding to a certain radical, are further classified with respect to the information on many strokes.

In China, the system of basic strokes is standardized. The basic strokes are represented by numerals 1-5. More specifically, "1" represents "horizontal stroke," which is written from the left to the right. "2" represents "vertical stroke," which is written from the upward to the downward. "3" represents "left-falling stroke," which is written from the upper right to lower left. "4" represents "right-falling stroke," which is written from upper left to lower right. "5" represents "turning stroke," which is one of various bending lines. Besides the aforementioned numerals 1–5, according to the classification of the present invention, the numeral "0" is used for representing that there are no stroke. It is expected that the classification's adoption of the basic strokes helps prevalence of the standard of the basic strokes and education of the Chinese characters.

Figure 2:
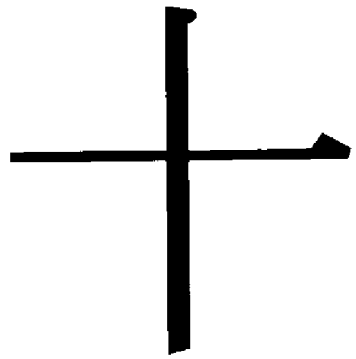
FIG. 2 is a schematic diagram showing a Chinese character.
Figure 3:
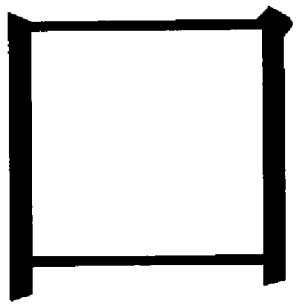
FIG. 3 is a schematic diagram showing a Chinese character.

The basic strokes and the stroke order are represented by the numerals being lined up. For example, the string "1" represents that the first stroke is horizontal. The string "1 2" represents that the first stroke is horizontal and the second stroke is vertical. The numeral strings as described above are utilized to define graphic form groups. Besides the aforementioned numerals, a radical and a character themselves are utilized to represent the basic strokes and the stroke order. For example, the character shown in FIG. 2 represents the first stroke is the horizontal and the second stroke is the vertical with both strokes being crossed together. The character shown in FIG. 3 represents the first stroke is the vertical, the second stroke is the turning, and the third stroke is the horizontal, with the strokes are written like a rectangle.

Figure 4:
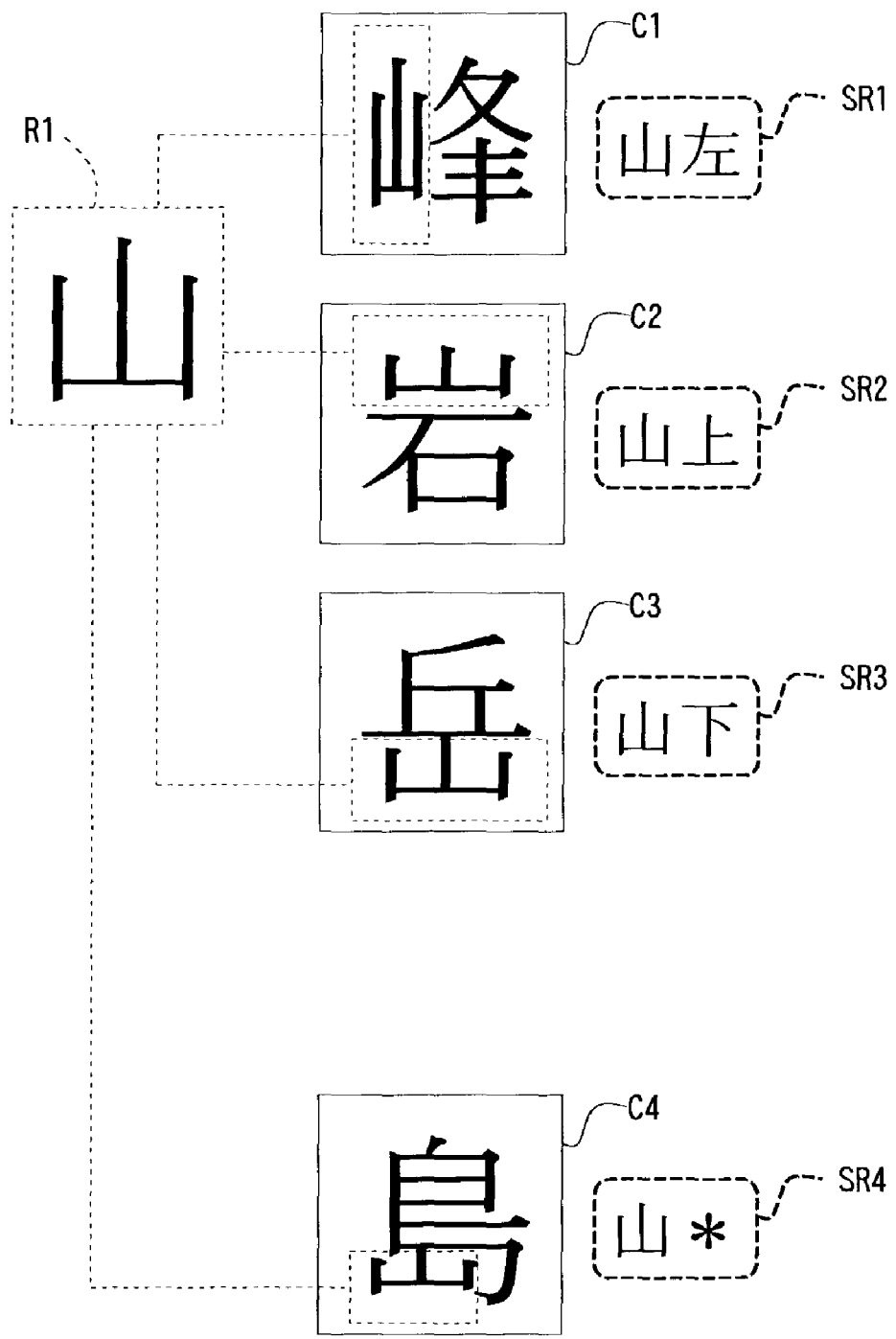
FIG. 4 is an explanatory diagram showing a radical and its position in characters.

Moreover, some of graphic form groups are defined with respect to the position of the radical in a character. As shown in FIG. 4, radical R1 is located in the left portion of character C1, located in the upper portion of character C2, and located in the lower portion of character C3. Characters C1–C3 are represented by radical R1 and the information on their positions, which is expressed as character strings SR1–SR3, respectively. Each of character strings C1–C3 is composed of radical R1 and a symbol character indicating the position.

Figure 5:
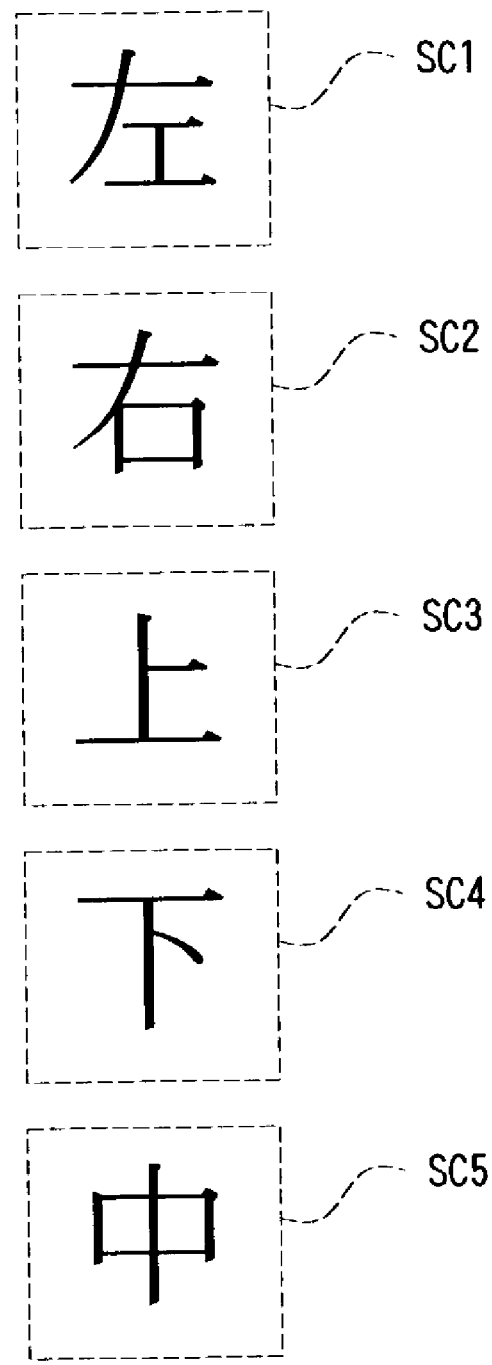
FIG. 5 is a schematic diagram showing symbol characters indicating the radical's position.

FIG. 5 is a schematic diagram showing symbol characters indicating the position of a radical. Symbol characters SC1–SC5 indicate the left, right, upper, lower, and inside position in a character concerned, respectively. The features of character C1 shown in FIG. 4 is represented by character string SR1, which is composed of radical R1 and symbol character SC1 shown in FIG. 5. The features of character C2 shown in FIG. 4 is represented by character string SR2, which is composed of radical R1 and symbol character SC3 shown in FIG. 5. The features of character C3 shown in FIG. 4 is represented by character string SR3, which is composed of radical R1 and symbol character SC4 shown in FIG. 5. When the position of radical R1 does not correspond to symbol characters SC1–SC5, the position is represented by an asterisk "*," which means exception. The position of radical R1 in character C4, not corresponding to symbol characters SC1–SC5, is represented by "*." Accordingly, the features of character C4 shown in FIG. 4 is represented by character string SR4, which is composed of radical R1 and "*."

Figure 6:
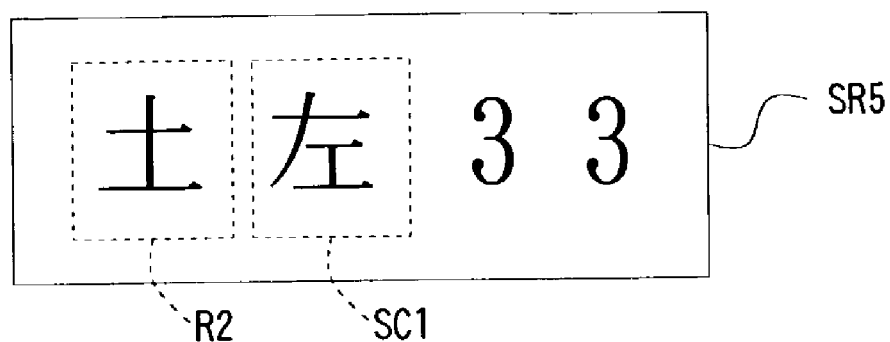
FIG. 6 is an explanatory diagram showing representation of character strings.
Figure 6:
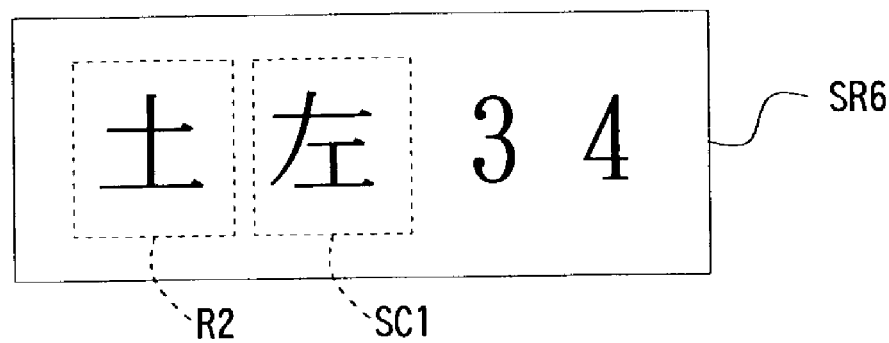
Figure 6:
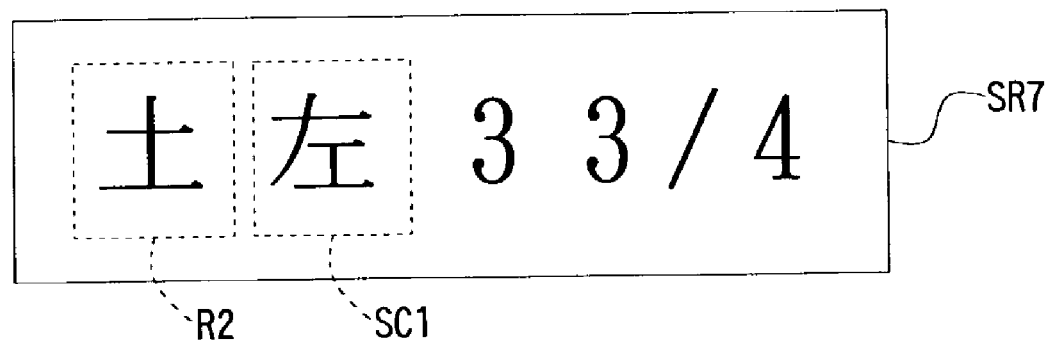

FIG. 6 is an explanatory diagram showing representation of character strings. Character string SR5 is composed of radical R2, symbol character SC, and a pair of "3" representing left-falling stroke. According to the aforementioned representation, character string SR5 means that in a certain character concerned radical R2 is located in left position, the first stroke thereof is left-falling stroke, and the second stroke thereof is also left-falling stroke. Character string SR6 is composed of radical R2, symbol character SC1, "3" representing left-falling stroke, and "4" representing right-falling stroke. Accordingly, character string SR6 means that in a certain character concerned radical R2 is located in left position, the first stroke thereof is left-falling stroke, and the second stroke thereof is right-falling stroke.

Each of character strings SR5 and SR6 can form a Chinese character group to which Chinese characters having the features represented by the corresponding character string. If both of characters belonging to a group prescribed by character string SR5 and those belonging to a group prescribed by character string SR6 are too few in number to form respective character groups, both groups may form a common character group, which is represented by character string SR7 shown in FIG. 6. Character string SR7 composed of radical R2, symbol character SC1, and "33/4." The symbol "/" means "or," and is effective only to immediate before and after by one character in the character string concerned. Accordingly, character string SR7 is equivalent to character string SR5 or character string SR6. That is, a character group represented by character string SR7 equals to a union of character groups represented by respective character strings SR5 and SR6.

Figure 7:
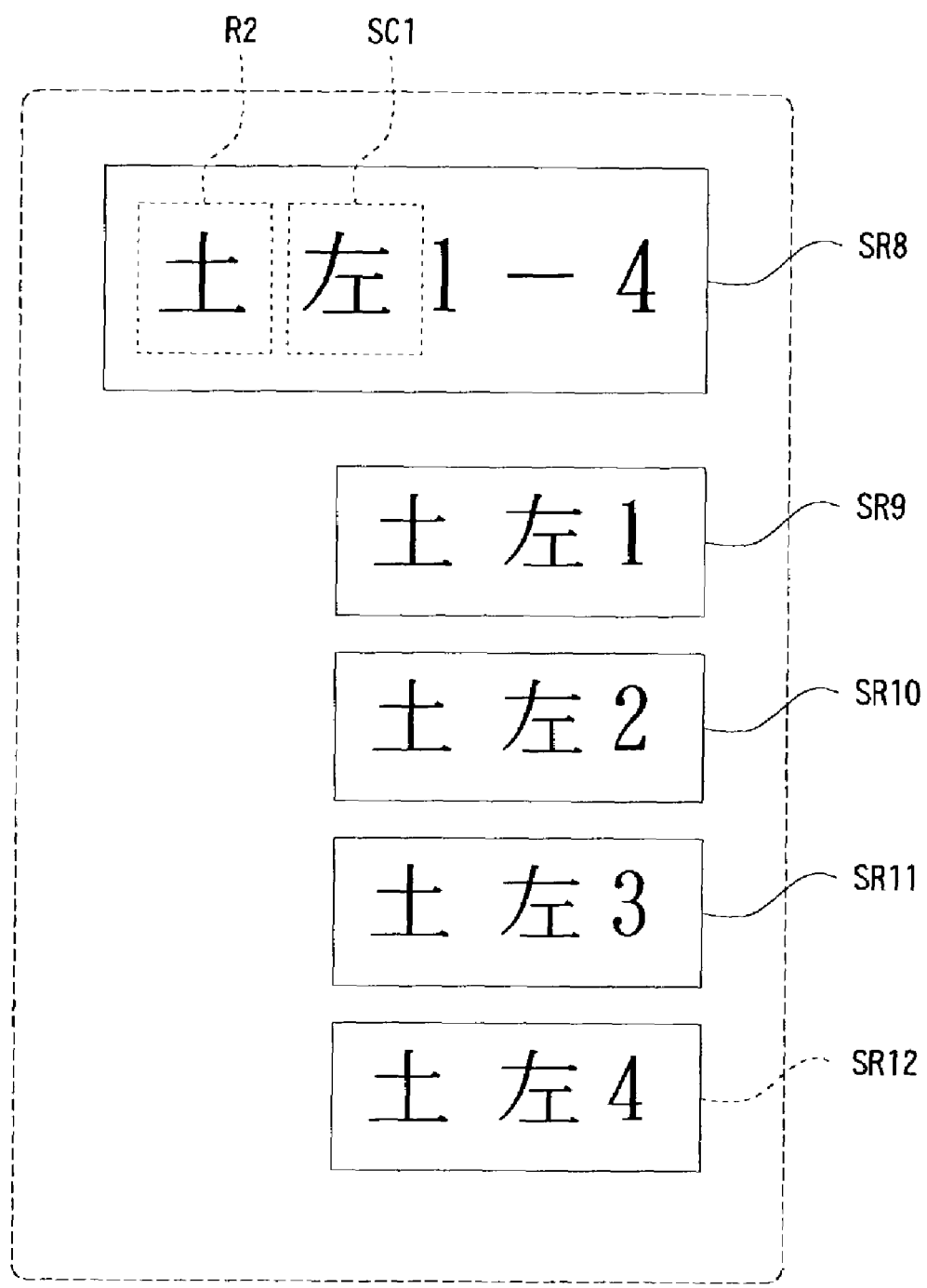
FIG. 7 is an explanatory diagram showing representation of character strings.

The symbol "–" is used for representing a range. Character string SR8 shown in FIG. 7 is composed of radical R2, symbol character SC1, and "1–4." Accordingly, a character group represented by character string SR8 equals to a union of character groups represented by respective character strings SR9–SR12.

In the present embodiment, Chinese characters are classified into about 950 character groups with frequently used characters being properly spread. Each of character groups is uniquely identified according to the aforementioned representation. Character groups prescribed with respect to this representation, is designated as small graphic form group.

As shown in FIG. 1, some 950 small graphic form groups (GF(S)) are incorporated into hierarchy which includes medium graphic form groups (GF(M)) and large graphic form groups (GF(L)) so that each small graphic form group can be specified by three keystrokes to a keypad equivalent to a numeric keypad. More specifically, each small graphic form group belongs to one of the ten or less medium graphic form groups, in turn, each medium graphic form group belongs to one of the ten large graphic form groups. As described above, Chinese characters are classified according to the tree structure composed of the large, medium, and small graphic form groups.

Figure 8:
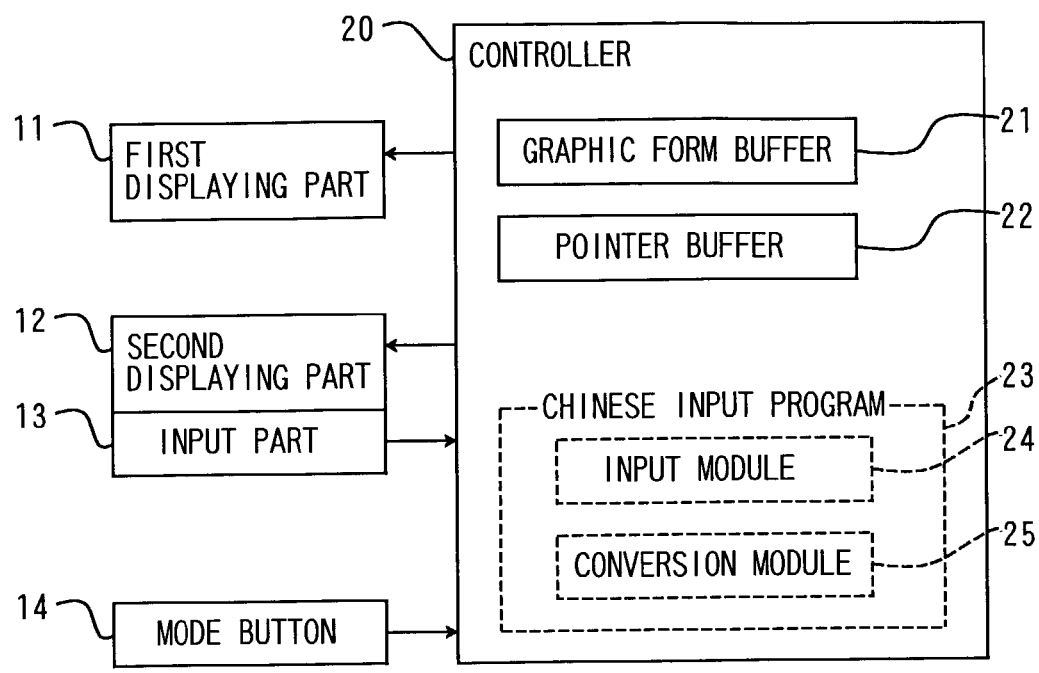
FIG. 8 is a block diagram schematically showing architecture for input of the Chinese language based on graphic form according to an embodiment of the present invention.
Figure 9:
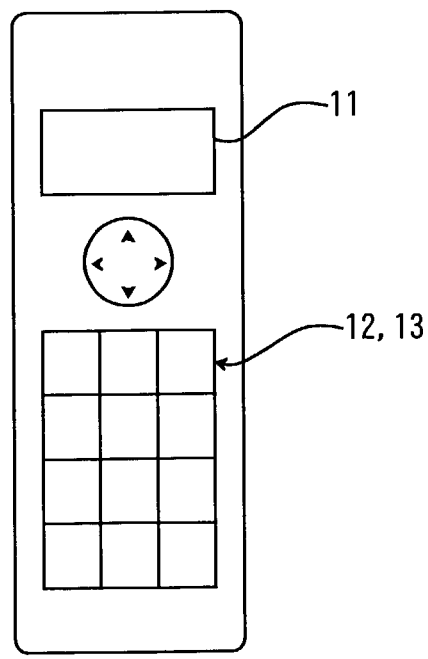
FIG. 9 is a schematic diagram showing the appearance of a cellular phone with a touch pad.

FIG. 8 is a block diagram schematically showing a cellular phone's configuration related to the process for inputting the Chinese language according to the embodiment. FIG. 9 is a schematic diagram showing the appearance of the cellular phone. This cellular phone comprises first displaying part 11, second displaying part 12, input part 13, mode button 14, and controller 20. First displaying part 11 is composed of a display device such as a liquid crystal display, and is able to display characters, numerals and other symbols. Second displaying part 12 is composed of a display device such as a liquid crystal display. On the surface of displaying part 12, input part 13 is provided which is composed of a transparent touch pad. Mode button 14 is used for changing input modes. These modes are a phone number mode for inputting a digit with a keystroke, an alphanumeric mode for inputting an alphanumeric letter with two keystrokes, and a Chinese mode for inputting a Chinese character's graphic features with three keystrokes.

Controller 20 is connected to each of first displaying part 11, second displaying part 12, input part 13, and mode button 14. Controller 20 can display desired letters or characters on first displaying part 11. The screen of second displaying part 12 is sectioned into four rows and three columns of rectangular regions. Controller 20 displays desired numerals, other symbols, or characters on the respective rectangular regions.

When input part 13 is depressed, controller 20 detects which region at input part 13 is depressed. This enables controller 20, when a user depresses a region of input part 13 corresponding to that of displaying part 12, to detect which region is depressed. Thus, the rectangular regions are used as independent buttons (keys).

The controller 20 further comprises graphic form buffer 21 and pointer buffer 22, which are capable of storing data. The graphic form buffer 21 is used for obtaining input history of input part 13 at the Chinese mode. The piece of information stored in buffer 21 is also used for returning the processing to the previous step when a backspace key is pressed. Further, the controller 20 has ROM (Read Only Memory) as a storing device in which Chinese input program 23 is stored. Chinese input program 23 comprises input module 24 and conversion module 25.

This cellular phone has a wireless transmitting and a receiving part, a microphone, and a speaker so that the user can make a call as with an ordinary cellular phone. Besides, the user can input text data including alphanumeric letters and Chinese characters into the cellular phone for email.

The alphanumeric letters and the Chinese characters are input at the alphanumeric mode and the Chinese mode, respectively. The user operates the mode button 14 to change the alpha numeric and Chinese modes. Controller 20 acquires the alphanumeric letters at the alphanumeric mode, and the Chinese characters at the Chinese mode.

Figure 10:
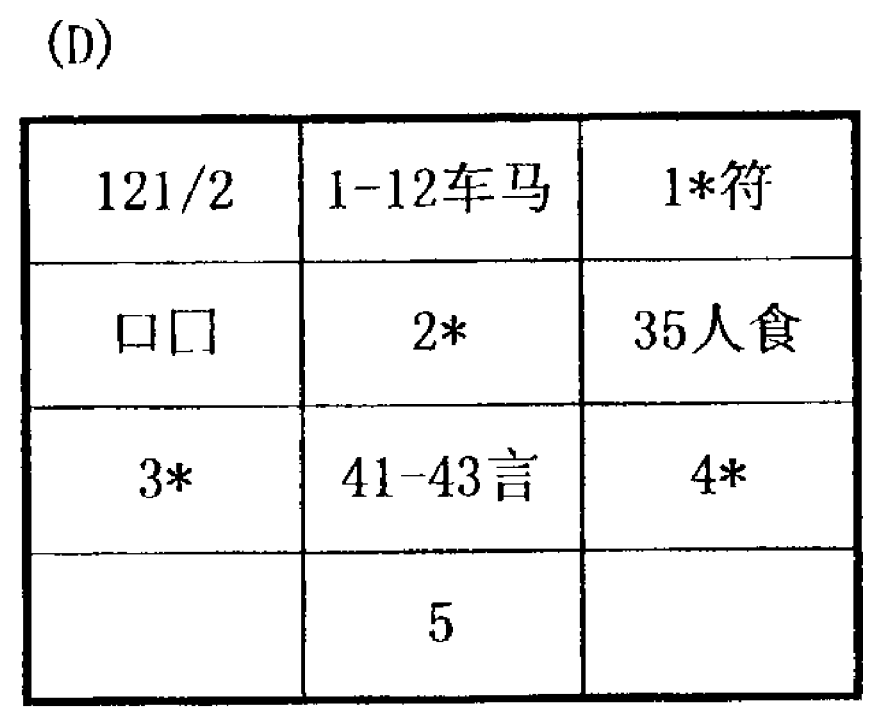

FIG. 10 is a schematic view of second displaying part 12 at the Chinese input mode. Note that FIG. 10 illustrates the displaying part 12 at the large group selecting stage which will be described later. When the Chinese mode is set by mode button 14 being pushed, on displaying part 12 is displayed input guidance shown in FIG. 10.

Figure 11:
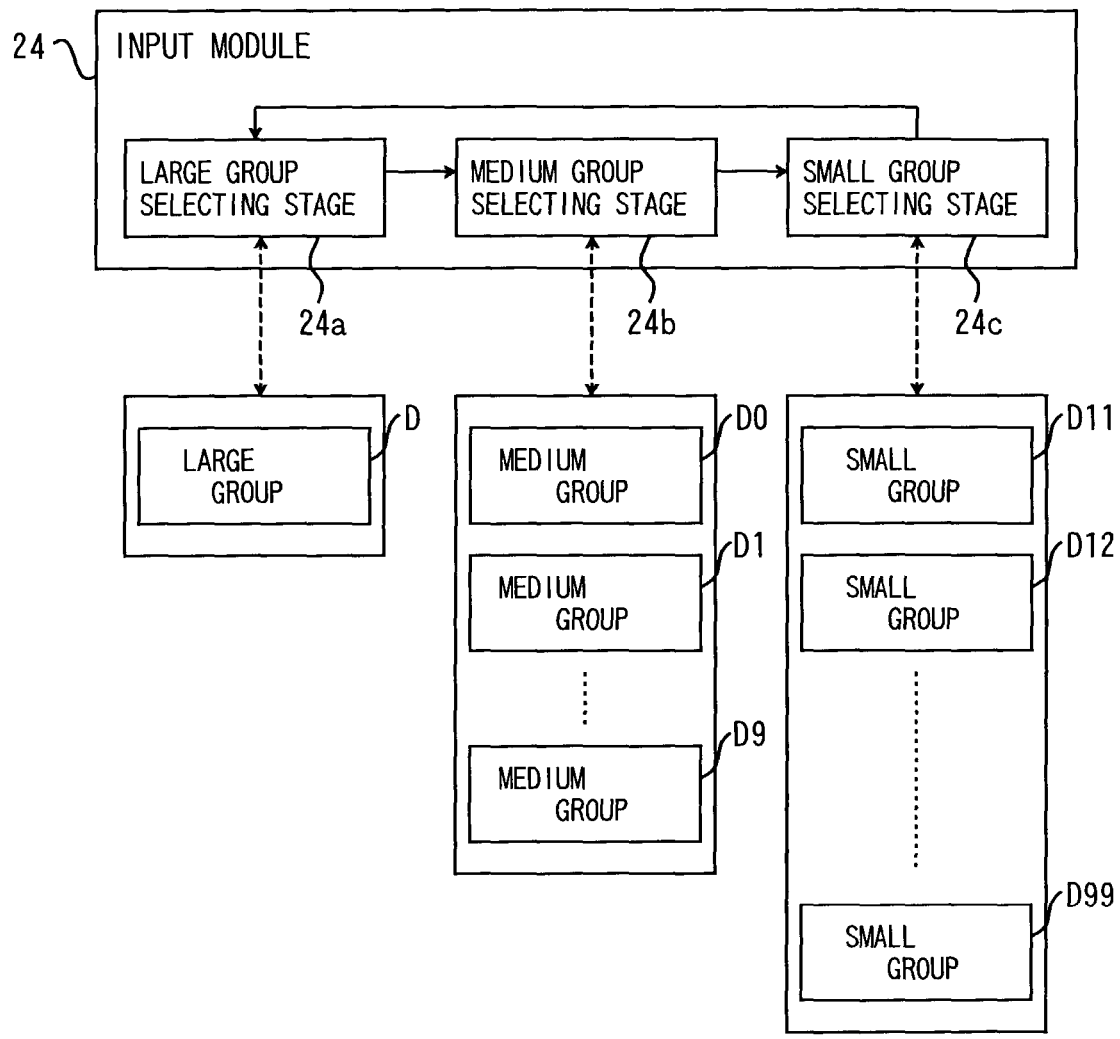
FIG. 11 is a schematic diagram showing the configuration of the input module of the Chinese language input program.

FIG. 11 is a schematic diagram showing the configuration of input module 24 of Chinese language input program 23. Input module 24 includes code segments corresponding to large group selecting stage 24a, medium group selecting stage 24b, and small group selecting stage 24c, respectively. Large group selecting stage 24a corresponds to the first keystroke. Medium group selecting stage 24a corresponds to the second keystroke. Small group selecting stage 24a corresponds to the third keystroke.

Further, there are stored large table D, medium tables D0–D9, and small tables D00–D99 in ROM of the controller 20. Large table D is looked up at large group selecting stage 24a, medium tables D1–D9 are looked up at the medium group selecting stage 24b, and small tables D00–D99 are looked up at the small group selecting stage 24c.

FIG. 12 is a schematic diagram showing large table D, which includes records each having "button," "guide," and "pointer" fields. Each "button" field is stored with a numeric code to be generated when the corresponding one of ten buttons (1–9, 0) is pressed.

The records in large table D correspond to the large graphic form groups, respectively. In the "guide" field of the record, a character string is stored which represents the corresponding large graphic form group. In the "pointer" field of the record, a pointer to one of medium groups D0–D9 is stored. Note that at medium group selecting stage 24b only one of medium tables D0–D9 is looked up. In other words, the "pointer" in the record corresponding to the large graphic form group selected at large group selecting stage 24a, designates one of medium tables D0–D9.

After the first touch of the button completed large group selecting stage 24a by a record in large group D being selected, medium group selecting stage 24b is executed. In medium group selecting stage 24b, one of medium tables D0–D9 is looked up. FIG. 13 is a schematic diagram showing medium tables D0–D9, each having a plurality of records. Each of records has "button," "guide," and "pointer" fields. Each "button" field is stored with a numeric code to be generated when the corresponding one of ten buttons (1–9, 0) is pressed.

The records in medium tables D0–D9 correspond to the medium graphic form groups, respectively. In the "guide" field of the record, a character string is stored which represents the corresponding medium graphic form group. In the "pointer" field of the record, a pointer to one of small tables D00–D99 is stored. Note that at small group selecting stage 24c only one of small groups D00–D99 is looked up. In other words, the "pointer" in the record corresponding to the medium graphic form group selected at medium group selecting stage 24b, designates one of small tables D00–D99.

FIG. 14 is a schematic diagram showing views of second displaying part 12 at medium group selecting stage 24b. After a touch of a button shown in FIG. 10 completed large group selecting stage 24a, one of screens (D1)–(D9) in FIG. 14 is displayed on displaying part 12 at medium group selecting stage 24b. In FIG. 14, the screens are arranged in four rows and three columns, which correspond to the buttons shown in FIG. 10 arranged in four rows and three columns. Ten of the twelve buttons shown in FIG. 10 are used for large group selecting. When one of these ten buttons is pressed, a screen is displayed which is located at corresponding position in FIG. 14.

After the second touch of the button completed medium group selecting stage 24b by a record in medium tables D0–D9 being selected, small group selecting stage 24c is executed. In small group selecting stage 24c, one of small tables D00–D99 is looked up. FIG. 15 is a schematic diagram showing small tables D00–D99, each having a plurality of records. Each of records has "button," "guide," and "G.F. code" fields. Each "button" field is stored with a numeric code to be generated when the corresponding one of ten buttons (1–9, 0) is pressed.

The records in small tables D00–D99 correspond to the small graphic form groups, respectively. In the "guide" field of the record, a character string is stored which represents the corresponding small graphic form group. In the "G.F. code" field of the record, a graphic form code uniquely assigned to the corresponding small graphic form group.

FIGS. 16–25 are schematic diagrams showing views of second displaying part 12 at small group selecting stage 24c. After a touch of a button shown in FIG. 14 completed medium group selecting stage 24b, one of screens shown in FIGS. 16–25 is displayed on displaying part 12 at small group selecting stage 24c.

In FIG. 16, the screens are arranged in four rows and three columns, which correspond to the buttons of screen (D1) shown in FIG. 14 arranged in four rows and three columns. When one of these buttons is pressed, a screen is displayed which is located at corresponding position in FIG. 16. In an analogous fashion, FIG. 17 corresponds to screen (D2) shown in FIG. 14, FIG. 18 corresponds to screen (D3) shown in FIG. 14, FIG. 19 corresponds to screen (D4) shown in FIG. 14, FIG. 20 corresponds to screen (D5) shown in FIG. 14, FIG. 21 corresponds to screen (D6) shown in FIG. 14, FIG. 22 corresponds to screen (D7) shown in FIG. 14, FIG. 23 corresponds to screen (D8) shown in FIG. 14, FIG. 24 corresponds to screen (D9) shown in FIG. 14, and FIG. 25 corresponds to screen (D0) shown in FIG. 14.

After the third touch of the button completed small group selecting stage 24c by a record in small tables D00–D99 being selected. This specifies a small graphic form group to which the desired character for input belongs.

Figure 26:
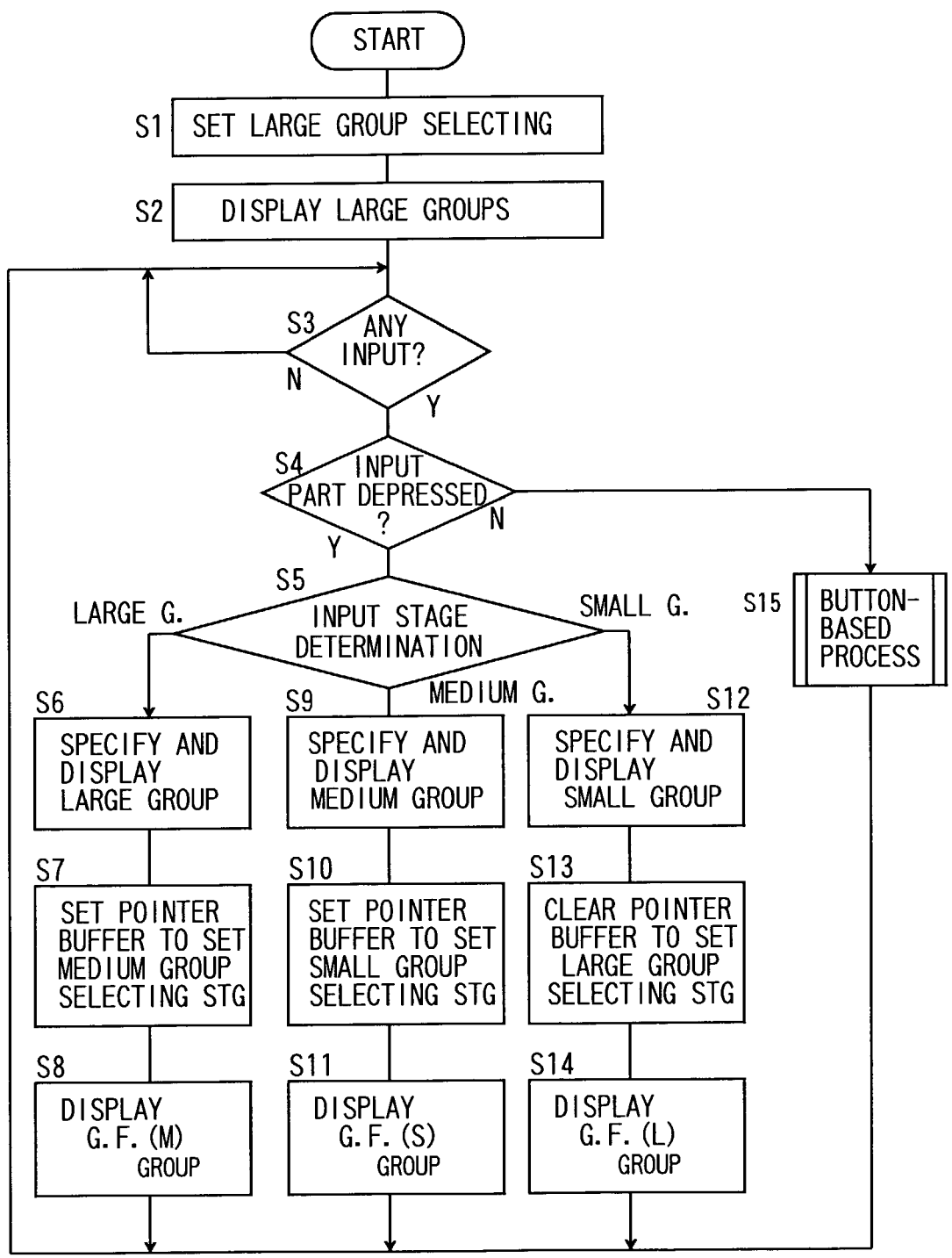
FIG. 26 is a flowchart showing the processing according to an embodiment of the present invention.

With reference to the flowchart in FIG. 26, the process of the input module 24 of the Chinese language input program 23, is further described below. The flowchart is initiated when the user pushes mode button 14 to set the Chinese input mode, and terminated when the user sets another input mode.

It should be noted that the controller 20 refers to pointer buffer 22 to recognize the present stage, which is one of the large, medium, and small group selecting stages. More specifically, the stage is the large group selecting stage when pointer buffer 22 is NULL. The stage is the medium group selecting stage when one of D0–D9 is stored in pointer buffer 22. The stage is the small group selecting stage when one of D00–D99 is stored in pointer buffer 22.

At step S1 controller 20 clears pointer buffer 22 NULL to set the large group selecting stage.

At step S2 controller 20 refers to large table D shown in FIG. 12 to display the alternatives of large graphic form groups (guidance) on displaying part 12. The screen shown in FIG. 10 is displayed thereon.

At step S3 controller 20 monitors input by the user. When input is detected, the processing advances to step S4.

At step S4 controller 20 distinguishes whether the input by the user was input part 13 being pushed or another types of input. Note that another types of input include input by operation of a backspace key, or keys assigned for functions of the conversion module 25. When it is distinguished that input part 13 was pushed, the processing advances to step S5. In other cases, the processing advances to step S15.

At step S5 controller 20 refers to pointer buffer 22 to distinguish which the present stage is the large group selecting stage, the medium group selecting stage, or the small group selecting stage. When the step is the large group selecting stage, the processing advances to step S6. When the stage is the medium group selecting stage, the processing advances to step S9. When the stage is the small group selecting stage, the processing advances to step S12.

At step S6 the controller 20 specifies which one of the buttons shown in FIG. 10 is touched, based on the place on input part 13 touched by the user. That is, controller 20 specifies which one of the records in large table D in FIG. 12 is selected by the user. Then controller 20 displays the large graphic form group corresponding to "guide" of the specified record on first displaying part 11. For example, when the record whose "guide" is "121/2" is specified, "121/2" is displayed on displaying part 11. Note that the large graphic form group "121/2" indicates medium graphic form groups in which characters have a radical starting with horizontal, vertical, and horizontal strokes (121), and medium graphic form groups in which characters have a radical starting with horizontal, vertical, and vertical strokes (122).

At step S7 controller 20 writes to pointer buffer 22 to set the input stage as the medium group selecting stage. More specifically, controller 20 obtains the value stored in the "pointer" field in the record of large table D (FIG. 12) specified at step S6, and writes the obtained value to pointer buffer 22. For example, when the record whose "guide" is "121/2" is specified, "D1" is stored in pointer buffer 22.

At step S8 controller 20 refers to one of the medium tables D0–D9 in FIG. 13 corresponding to the value stored in pointer buffer 22 to display alternatives of the medium graphic form groups on second displaying part 12. One of the screens (D0)–(D9) in FIG. 14 is displayed on displaying part 12. For example, when "D1" is stored in pointer buffer 22, screen (D1) in FIG. 14 is displayed. Then, the processing returns to step S3.

At step S9, because the stage has been specified as the medium group selecting stage, controller 20 specifies which one of the buttons displayed in FIG. 14 is touched on the basis of the place on input part 13 touched by the user. That is, controller 20 specifies which one of the records in medium tables D0–D9 (FIG. 13) is selected by the user. Then, controller 20 displays the medium graphic form group corresponding to "guide" of the specified record on first displaying part 11, instead of the large graphic form group displayed thereon.

At step S10 controller 20 writes to pointer buffer 22 to set the input stage as the small group selecting stage. More specifically, controller 20 obtains the value stored in the "pointer" field in the record specified at step S9 among the records in medium tables D0–D9 in FIG. 13, and writes the obtained value to pointer buffer 22. For example, when the record of the first row in medium table D1 shown in FIG. 13 is specified, "D11" is stored in pointer buffer 22.

At step S11 controller 20 refers to one of small tables D00–D99 shown in FIG. 15 corresponding to the value stored in pointer buffer 22 to display alternatives of the small graphic form group on second displaying part 12. One of screens (D00)–(D99) in FIGS. 16–25 is displayed on displaying part 12. For example, when "D11" is stored in pointer buffer 22, screen (D11) in FIG. 16 is displayed. Then, the processing returns to step S3.

At step S12, because the stage has been specified as the small group selecting stage, controller 20 specifies which one of the buttons displayed in FIGS. 16–25 is touched based on the place on input part 13 touched by the user. That is, controller 20 specifies which one of the records in small tables D00–D99 in FIG. 15 is selected by the user. The "G.F. code" of the specified record is determined as the graphic form code inputted by the user.

Further, controller 20 transmits the determined graphic form code to conversion module 25, and obtains a Chinese character corresponding to the determined code from the conversion module 25. Note that when a plurality of characters for alternatives exists, the character registered as the first alternative, for example, is obtained. It should be also noted that the conversion module 25 may take into account of the graphic form code previously inputted to select a Chinese character. Then, controller 20 displays the Chinese character obtained from conversion module 25 on first displaying part 11, instead of the medium graphic form group displayed thereon.

At step S13 controller 20 clear pointer buffer 22 to set the input stage as the large group selecting stage. In other words, pointer buffer 22 is set to be NULL for the next input.

At step S14 controller 20 refers to large table D shown in FIG. 12 to display the alternatives of the large graphic form groups on second displaying part 12. On the displaying part 12 is displayed the screen shown in FIG. 10. Then, the processing returns to step S3.

On the other hand, at step S15, controller 20 executes a process corresponding to the operation by the user. For example, if a key used for the conversion module 25 was depressed, controller 20 executes the processing such as selecting or specifying a Chinese character, according to the function assigned to the key. Then, the processing returns to step S3.

As described above, according to the embodiment, each small graphic form group is specified by three touches of keys. Then, conversion to a Chinese character is executed based on the graphic form code corresponding to the specified small graphic form group. The conversion will hereinafter be described.

The conversion is made by dictionary data stored in storing device being looked up. Note that the conversion may be executed by a word. More specifically, the conversion by a word can be executed, after small graphic form groups to which characters composing the desired word for input belong are specified, based on a combination of the graphic form codes related to the respective small graphic form groups with being aligned successively.

FIG. 27 is a schematic diagram showing dictionary data, which has a plurality of records corresponding to combinations of graphic form codes. More specifically, in each record, "G.F. code" field is stored with a combination of graphic form codes, and "WORD" field is stored with Chinese words having features prescribed by the combination of the graphic form codes. The Chinese words are aligned in order of frequency of use. Conversion module 25 refers to the dictionary data to specify a record, and displays the most frequently used word in "WORD" field of the specified record on first displaying part 11.

When the word displayed does not match to that for input, the user can select another alternative stored in "WORD" field by depress a button to which a function for conversion is assigned. The alignment of the words in "WORD" field can be updated with respect to frequency of use of words concerned. The alignment can be fixed or updated.

Note that the term of "word" according to the present description contains a certain grammatical element which the Chinese grammar does not regard as a word. It should be also noted that the conversion can be made by a character string composed of a phrase.

Figure 28:
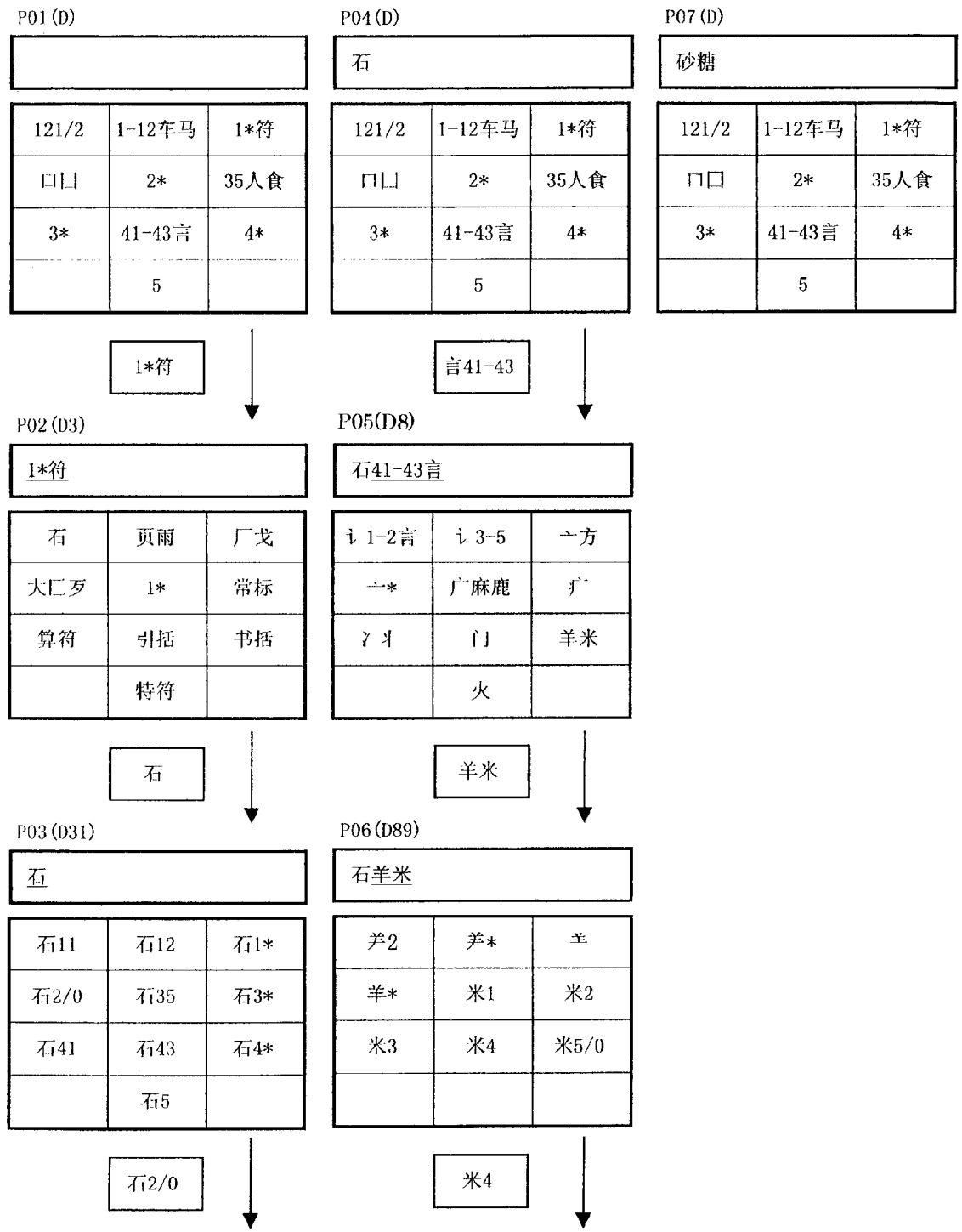
FIG. 28 is a diagram showing an example of graphic form input of the Chinese characters according to the first embodiment of the present invention.

More specific description on input of a word is described bellow with reference to FIG. 28. Each of the display examples P01–P07 in FIG. 28 schematically shows both of displaying parts 11 and 12.

The screen displayed first is shown in P01 in FIG. 28, according to which the alternatives of the large graphic form groups in large table D are displayed on second displaying part 12. Note that nothing is displayed on first displaying part 11. When the user pushes a button to select a large graphic form group, displaying parts 11 and 12 are switched to the state shown as P02.

In the state P02, the large graphic form group selected is displayed on first displaying part 11, and the alternatives of the medium graphic form groups in a medium table are displayed on second displaying part 12. When the user pushes a button to select a medium graphic form group, displaying parts 11 and 12 are switched to the state shown as P03.

In the state P03, the medium graphic form group selected is displayed on first displaying part 11, and the alternatives of the small graphic form groups in a small table are displayed on second displaying part 12. When the user pushes a button to select a small graphic form group, displaying parts 11 and 12 are switched to the state shown as P04.

In the state P04, the most frequently used character in the small graphic form group selected is displayed on first displaying part 11, and the alternatives of the large graphic form groups in large table D are displayed on second displaying part 12 for next input. When the user pushes a button to select a large graphic form group, displaying parts 11 and 12 are switched to the state shown as P05.

In the state P05, the large graphic form group newly selected is displayed on first displaying part 11 with the preceding character, and the alternatives of the medium graphic form groups in a medium table are displayed on second displaying part 12. When the user pushes a button to select a medium graphic form group, displaying parts 11 and 12 are switched to the state shown as P06.

In the state P06, the medium graphic form group newly selected is displayed on first displaying part 11 with the preceding character, and the alternatives of the small graphic form groups in a small table are displayed on second displaying part 12. When the user pushes a button to select a small graphic form group, displaying parts 11 and 12 are switched to the state shown as P07.

In the state P07, the desired word composed of two characters is displayed on first displaying part 11 instead of the most frequently used character, because conversion is newly executed based on both of the small graphic form groups previously inputted and subsequently inputted.

Figure 29:
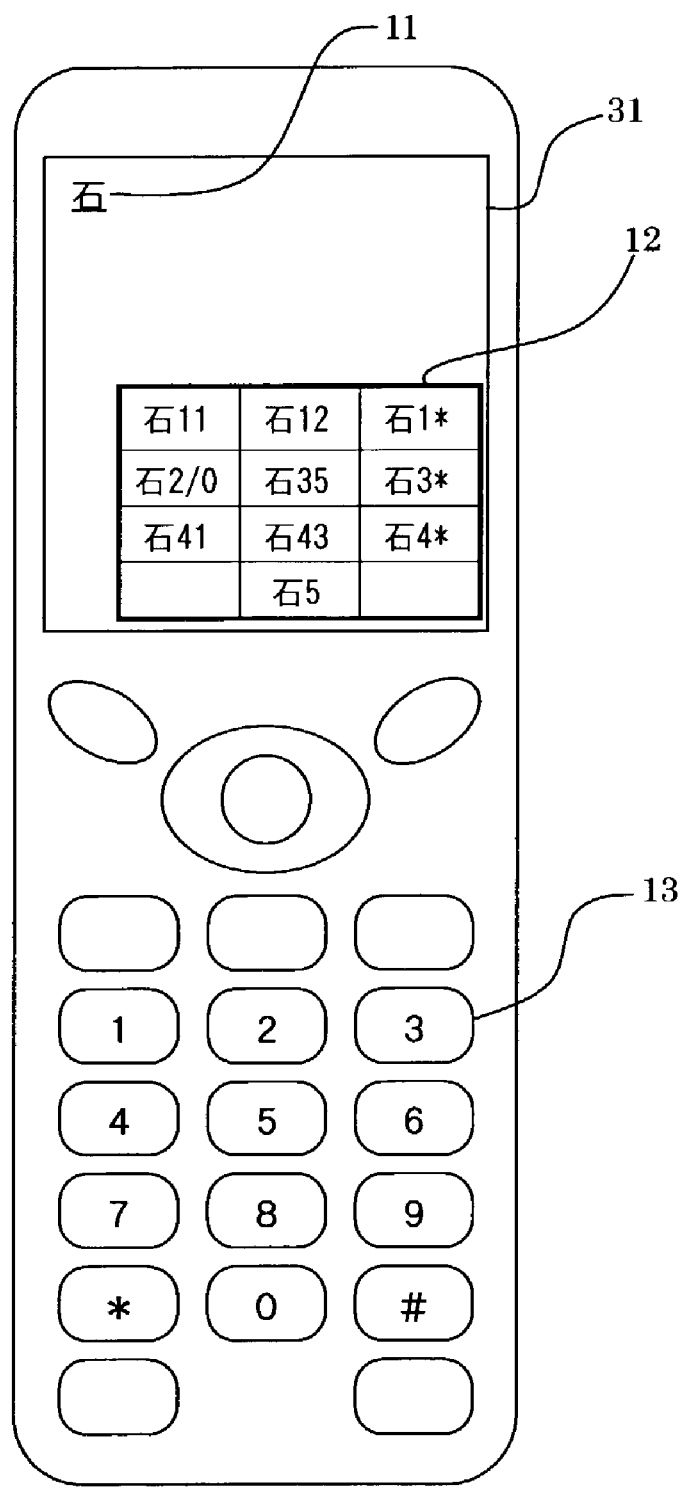
FIG. 29 is a diagram showing a schematic view of a popular type cellular phone.

The cellular phone shown in FIGS. 8 and 9 is that with a touch pad. This invention is also applicable to ordinary cellular phones. FIG. 29 is a diagram showing a schematic view of a popular type cellular phone, which has merely one liquid crystal display 31. With this architecture, items to be displayed, including first displaying part 11 for displaying what is inputted and second displaying part 12 for displaying the buttons of alternatives, should be arranged within the screen of display 31. The user is able to input the Chinese language in the same manner as described above, by pushing the numeric keys equivalent to input part 13 with reference to what is displayed corresponding to that on displaying part 12.

With the Chinese language input method configured as described above, three touches of a keypad with ten-odd keys determines a small graphic form group. Chinese characters are classified so that frequently used characters should not concentrate a small graphic form group. Consequently, three keystrokes efficiently narrows down alternative characters for input.

A verification test on efficiency of conversion is executed using a dictionary which is made for the test based on the aforementioned classification with small graphic form groups. In the dictionary, the alignment is fixed of words with respect to the frequency of use. In addition, the dictionary does not include attribute information. However, the hit rate comes to 87.8%, under conditions that 10,680,000 characters inclueded in the People's Daily published in a year are used and conversion is made only to the first alternative of each small graphic form group. The hit rate becomes higher with dynamic update of words' alignment in the dictionary and analysis of collocation of words based on the dictionary including attribute information on word class and grammar. Consequently, the Chinese input is actualized which executes precise and efficient conversion.

With the classification concerning characters' graphic form described in this embodiment, every Chinese character is specified based on the small graphic form group to which the same character belongs. This eliminates users having to keep in mind the rule prescribing combinations of Chinese character components which is a requirement of the conventional Chinese input. Moreover, the Chinese input program of the embodiment provides users with input guidance according to the hierarchy of the classification. Consequently, user-friendly Chinese input is actualized.

According to the present invention configured as described above, a small graphic form group is specified by limited number of keystrokes to a keypad with ten-odd keys. Consequently, the alternative Chinese characters for conversion are efficiently narrowed down.

What is claimed is:

1. A computer readable recording medium storing a program including a Chinese language input program, said program controlling a computer to execute:

presenting large graphic form groups according to a hierarchy comprising a multiplicity of small graphic form groups into which Chinese characters concerned for input are classified, medium graphic form groups into which the small graphic form groups are classified, and the large graphic form groups into which the medium graphic form groups are classified;

specifying one among the large graphic form groups presented according to a user's designation;

presenting the medium graphic form groups which belong to the specified large graphic form group;

specifying one among the medium graphic form groups presented according to a user's designation;

presenting the small graphic form groups which belong to the specified medium graphic form group; and specifying one among the small graphic form groups presented according to a user's designation.

2. The recording medium according to claim 1, wherein the large graphic form groups are created as many as a limited number so that each of the large graphic form groups can be specified by a keystroke to an input unit with the limited number of buttons equivalent to a numeric keypad,
the medium graphic form groups which belong to each of the large graphic form groups are created as many as the limited number, and
the small graphic form groups which belong to each of the medium graphic form groups are created as many as the limited number.

3. recording medium according to claim 1, wherein in said presenting large graphic form groups, the large graphic form groups are presented with guidance representing graphic features of the medium graphic form groups belonging to each of the large graphic form groups;
in said presenting the medium form groups, the medium graphic form groups are presented with guidance representing graphic features of the small graphic form groups belonging to each of the medium graphic form groups; and
in said presenting the small graphic form groups, the small graphic form groups are presented with guidance representing graphic features of Chinese characters belonging to each of the small graphic form groups.

4. The recording medium according to claim 1, wherein the small graphic form groups are classified with respect to radicals of Chinese characters.

5. The recording medium according to claim 1, wherein the small graphic form groups are classified with respect to strokes and stroke order of Chinese characters.

6. The recording medium according to claim 1, wherein the small graphic form groups are classified with respect to strokes and stroke order of a Chinese characters' elements excluding radicals.

7. The recording medium according to claim 1, said program controlling a computer further to execute:
referring to dictionary data which relates combinations of small graphic form groups to respective Chinese character strings; and
determining a string among Chinese character strings in the dictionary data by obtaining the same string corresponding to a combination of specified small graphic form groups.

8. A Chinese language input apparatus comprising:
an input unit;
a controller for executing program-based processing, said controller being connected to the input unit; and
a storing device containing a Chinese language input program, said program controlling the controller to execute:
presenting large graphic form groups according to a hierarchy comprising a multiplicity of small graphic form groups into which Chinese characters concerned for input are classified, medium graphic form groups into which the small graphic form groups are classified, and the large graphic form groups into which the medium graphic form groups are classified;
specifying one among the large graphic form groups presented according to an input to the input unit;
presenting the medium graphic form groups which belong to the specified large graphic form group;
specifying one among the medium graphic form groups presented according to an input to the input unit;
presenting the small graphic form groups which belong to the specified medium graphic form group; and
specifying one among the small graphic form groups presented according to an input to the input unit.

9. The apparatus according to claim 8, wherein
the input unit having a limited number of buttons equivalent to those of a numeric keypad,
the large graphic form groups are created as many as the limited number,
the medium graphic form groups which belong to each of the large graphic form groups are created as many as the limited number, and
the small graphic form groups which belong to each of the medium graphic form groups are created as many as the limited number.

10. A computer implemented Chinese language input method, comprising:
presenting large graphic form groups according to a hierarchy comprising a multiplicity of small graphic form groups into which Chinese characters concerned for input are classified, medium graphic form groups into which the small graphic form groups are classified, and the large graphic form groups into which the medium graphic form groups are classified;
specifying one among the large graphic form groups presented according to a user's designation;
presenting the medium graphic form groups which belong to the specified large graphic form group;
specifying one among the medium graphic form groups presented according to a user's designation;
presenting the small graphic form groups which belong to the specified medium graphic form group; and
specifying one among the small graphic form groups presented according to a user's designation.

11. The method according to claim 10, wherein the large graphic form groups are created as many as a limited number so that each of the large graphic form groups can be specified by a keystroke to an input unit with the limited number of buttons equivalent to a numeric keypad,
the medium graphic form groups which belong to each of the large graphic form groups are created as many as the limited number, and
the small graphic form groups which belong to each of the medium graphic form groups are created as many as the limited number.

* * * * *

UNITED STATES PATENT AND TRADEMARK OFFICE
CERTIFICATE OF CORRECTION

PATENT NO. : 7,058,900 B2  Page 1 of 1
APPLICATION NO. : 10/193165
DATED : June 6, 2006
INVENTOR(S) : Jin Sugano It is certified that error appears in the above-identified patent and that said Letters Patent is hereby corrected as shown below:

Col. 13, line 12, before "recording" insert --The--

Signed and Sealed this

Tenth Day of April, 2007

JON W. DUDAS
*Director of the United States Patent and Trademark Office*